March 23, 1954      J. G. VEHIGE      2,672,806

REGULATOR VALVE

Filed June 5, 1950

INVENTOR.
JOSEPH G. VEHIGE

BY *William R. Lane*

ATTORNEY

Patented Mar. 23, 1954

2,672,806

UNITED STATES PATENT OFFICE 2,672,806

REGULATOR VALVE

Joseph G. Vehige, Woodland Hills, Calif., assignor to North American Aviation, Inc.

Application June 5, 1950, Serial No. 166,177

3 Claims. (Cl. 98—40)

This invention relates to an improved air outlet valve.

In heating and ventilating systems for aircraft, it is desirable to have outlet valves controllable by individual passengers. In the past, difficulty has been experienced with these valves because of improper dispersion of the heating and ventilating medium. Also, the volume and direction of flow have been difficult to control. Some valves have been noisy to the extent of emitting whistling sounds, and generally it has been difficult to disperse the heating and ventilating air in such a way as to avoid discomfort to the passengers.

Accordingly it is an object of this invention to provide an air outlet valve which accurately controls the volume of fluid emitted.

It is also an object of this invention to provide a valve that will diffuse the fluid in such a manner as to avoid passenger discomfort.

It is yet another object of this invention to provide a valve which is easy to adjust.

It is still another object of this invention to provide a valve which is noiseless in operation and which at all times functions in a satisfactory manner.

Other objects of invention will become apparent from the following description taken in connection with the accompanying drawings, in which Fig. 1 is a sectional view partly in elevation;

Figure 1:
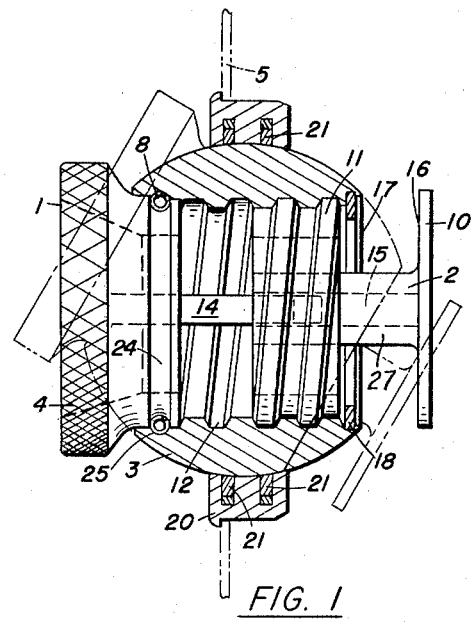

Referring to the drawings, there is shown a wall 5 comprising the inner wall of an aircraft or other structure to which a retaining ring 20 is rigidly attached. The interior of the retaining ring is curved to rotatably receive, with freedom for universal movement, a ball 3 provided with a passageway therethrough. Packing elements 21 seal the ball member with respect to retaining ring 20 and frictionally engage the same to hold it in adjusted position. Ring 20 is also provided with a pair of opposed cutout portions 23 along an inner edge thereof through which the truncated ends of ball 3 are adapted to pass when the ball is rotated to where the ends thereof are received in such recess for purposes of assembly and disassembly. Rotatably received within ball member 3 is valve member 2 comprising a pair of leg members 26 and 27 to which is attached a flat portion 10 adapted to engage a face 17 of the truncated ball member 3 to close the passageway as well as regulate its effective area. Also attached to the leg members 26 and 27 at the end opposite plate 10 is a cylindrical threaded portion 11 adapted to be received in threaded part 12 of ball 3. Valve member 2 is retained in ball 3 by means of a spring clip 18 adapted to be received in a recess in ball 3. Clip 18 also limits the outward movement of member 2. The legs of member 2 are recessed at 15 to slidably receive corresponding legs of U-shaped member 14 to provide a slip or driving connection whereby the nozzle and valve member 2 will rotate together and at the same time the plate 10 will move longitudinally with respect to the nozzle 1 and the body 3.

Figure 2:
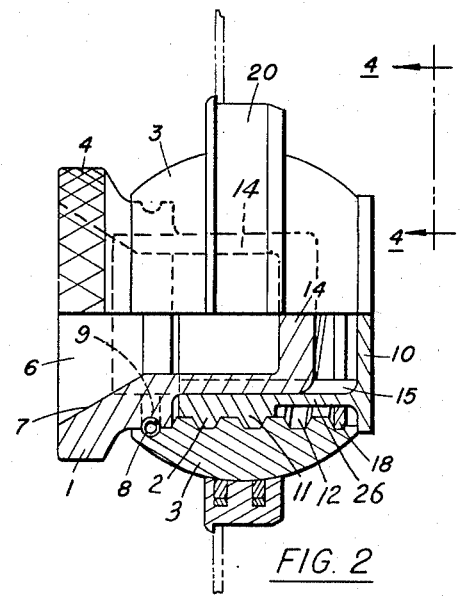
Fig. 2 is an elevational view partly in section taken along the line 2—2 of Fig. 3.
Figure 4:
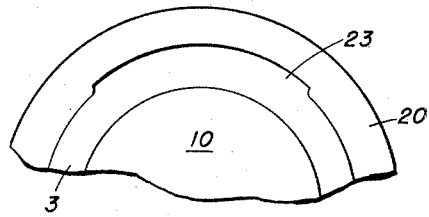
Fig. 4 is a part elevational view looking along the line 4—4 of Fig. 2.
Figure 3:
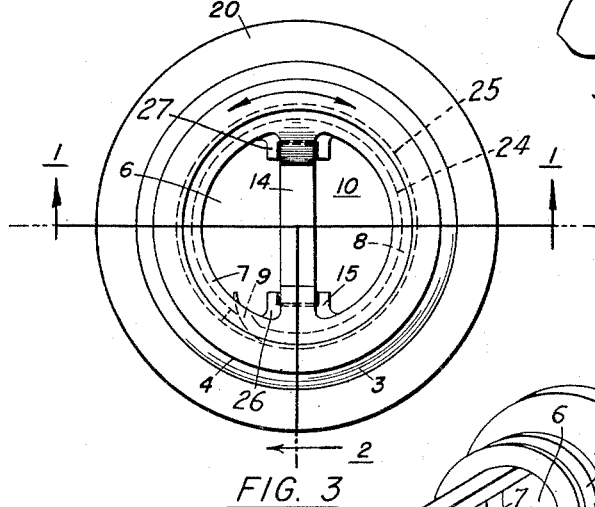
Fig. 3 is a front elevational view of the device.

Nozzle member 1 comprises a ring-shaped member having attached thereto a U-shaped portion 14 more particularly shown in Figs. 1, 2, and 3. The nozzle member is provided with an orifice 6 having an outwardly flared portion 7 to assist in dispersing the heating and ventilating fluid. The outer part of member 1 is knurled at 4 to permit a passenger to grip it for adjustment purposes.

Nozzle member 1 is rotatably mounted in ball 3 and is retained therein by spring 8 which is received in a pair of corresponding recesses 24 and 25, respectively, to permit rotative movement in ball 3 but prevent longitudinal movement with respect thereto. Recess 24 is located on the periphery of nozzle 1 while recess 25 is located interiorly of ball 3. Aperture 9 in member 1 connects with recesses 24 and 25, and provides access to these recesses from the interior of nozzle 1 to permit spring 8 to be placed in the space formed by recesses 24 and 25.

In the operation of the device, the passenger grips knurled portion 4 of member 1 and tilts it to any suitable position as shown in dotted lines in Fig. 1 and then rotates it to the desired adjusted position. The frictional resistance against rotation is much less than that between ball 3 and retaining ring 20 and, accordingly, ball 3 does not rotate with member 1. Counterclockwise movement of member 1 from the position shown in Fig. 1 causes member 2 to be drawn inwardly by reason of the engagement of horizontal legs of U-shaped member 14 in the recesses 15 of member 2 and the sliding movement resulting from combined rotation of members 1 and 2 and engagement of threads 11 of member 2 with threads 12 of ball 3. Longitudinal movement of member 2 with respect to ball 3 draws plate member 10 inwardly until portions 16 thereof engage truncated end 17 of ball 3. Clockwise rotation of member 1 causes member 2 to move outwardly any predetermined distance desired by the operator. The distance of plate 10 from truncated end 17 controls the volume of air passing through the passageway in ball 3 and orifice 6.

Figure 5:
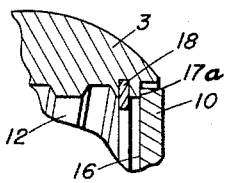
Fig. 5 is a sectional view of a modification of the construction illustrated in Fig. 1.
Figure 6:
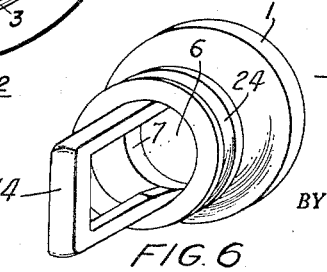
Fig. 6 is a perspective view of the nozzle portion.

In a modified form of the invention as illustrated in Fig. 5, plate 10 is adapted to abut a portion 17a which in turn is recessed inwardly from the outer portion of the sphere in such a way that member 10 will be in the radius of the sphere. This permits assembly and disassembly of ball member 3 with respect to retaining ring 20 without removal of member 10.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An air regulating valve assembly comprising a supporting ring, a truncated ball element mounted for universal movement in said supporting ring, said ball element having a passageway therethrough, a nozzle element rotatably mounted in the outer end of said passageway, means restraining said nozzle against longitudinal movement with respect to said passageway, a plate for adjustably closing the inner end of said passageway, said ball element being provided with an annular recess on the edge of the inner end of said passageway to receive said plate so that said plate when in a closed position will lie within the radius of said spherical element, means for adjustably supporting said plate and for moving said plate toward and away from the edge of said inner end of said passageway, including connection means between said nozzle and said plate for transmitting sliding movement to said plate upon rotation of said nozzle element.

2. An air regulating valve assembly for aircraft comprising a member adapted to be attached to said aircraft and having a passageway therethrough provided with screw threads, a nozzle rotatably mounted in one end of said passageway, means restraining said nozzle against longitudinal movement with respect to said passageway, a valve plate, means carried by said member for supporting and moving said plate to and from an edge of the other end of said passageway for opening and closing same and thereby controlling the effective inlet area thereof, said valve plate supporting means being provided with a screw-threaded portion engageable with said screw threads on said member, and slip connection means between said nozzle and said plate comprising a groove in said plate supporting means and a leg carried by said nozzle engaged in said groove whereby, upon rotation of said nozzle, said plate will be caused to move to and from closed position and retained in any adjusted position.

3. An air regulating valve assembly comprising a supporting ring, a truncated ball element mounted for universal movement in said supporting ring, said ball element having a passageway therethrough, a nozzle element rotatably mounted in the outer end of said passageway, means restraining said nozzle against longitudinal movement with respect to said passageway, a plate for engaging an edge of the inner end of said passageway for adjustably closing the same, means for adjustably supporting said plate and for moving said plate toward and away from said edge of said inner end of said passageway, including connection means between said nozzle and said plate for transmitting sliding movement to said plate upon rotation of said nozzle element.

JOSEPH G. VEHIGE.

References Cited in the file of this patent

UNITED STATES PATENTS

| Number | Name | Date |
|---|---|---|
| 854,595 | Newey | May 21, 1907 |
| 2,462,989 | Mufich et al. | Mar. 1, 1949 |
| 2,489,011 | Dahlin | Nov. 22, 1949 |
| 2,524,974 | Hickmott | Oct. 10, 1950 |
| 2,596,909 | Mufich et al. | May 13, 1952 |

FOREIGN PATENTS

| Number | Country | Date |
|---|---|---|
| 16,654 | Great Britain | July 16, 1909 |
| 360,727 | Great Britain | Nov. 12, 1931 |
| 520,452 | Great Britain | Apr. 24, 1940 |
| 662,360 | Germany | July 11, 1938 |
| 987,035 | France | Apr. 11, 1951 |